United States Patent
Sager

[11] Patent Number: 5,890,778
[45] Date of Patent: Apr. 6, 1999

[54] BRAKE DEVICE WITH AN ANTILOCK SYSTEM FOR A ROAD VEHICLE

[75] Inventor: Frank Sager, Farmington Hills, Mich.

[73] Assignee: Robert Bosch GmbH, Stuttgart, Germany

[21] Appl. No.: 663,041

[22] PCT Filed: Dec. 6, 1994

[86] PCT No.: PCT/DE94/01442

§ 371 Date: Aug. 19, 1996

§ 102(e) Date: Aug. 19, 1996

[87] PCT Pub. No.: WO95/16592

PCT Pub. Date: Jun. 22, 1995

[30] Foreign Application Priority Data

Dec. 16, 1993 [DE] Germany .......................... 43 42 918.1

[51] Int. Cl.$^6$ ................................ B60T 8/26; B60T 8/42; B60T 13/58

[52] U.S. Cl. .......................... 303/186; 188/156; 188/162; 188/349; 303/113.5; 303/113.4; 303/155; 303/116.1; 303/DIG. 4; 303/3

[58] Field of Search .............................. 303/115.2, 116.1, 303/119.1, 3, 155, 15, 162, 113.5, 186, 187, 188, 61, DIG. 3, DIG. 4, 113.1, 113.2, 116.2, 20, 10, 113.4, 152; 188/156, 162, 158, 106 P, 349; 180/65.2, 165

[56] References Cited

U.S. PATENT DOCUMENTS 4,865,399  9/1989  Atkins et al. .
4,875,741  10/1989  Ozawa et al. .
4,917,445  4/1990  Leppek et al. .
5,141,296  8/1992  Arikawa ................................ 303/116.1
5,163,743  11/1992  Leppek et al. .
5,234,262  8/1993  Walenty et al. .
5,261,731  11/1993  Yogo et al. ............................ 303/116.1

FOREIGN PATENT DOCUMENTS 0253157  1/1988  European Pat. Off. .
0260046  3/1988  European Pat. Off. .
3545800  7/1986  Germany .
2151731  7/1985  United Kingdom .

*Primary Examiner*—Douglas C. Butler
*Attorney, Agent, or Firm*—Edwin E. Greigg; Ronald E. Greigg

[57] ABSTRACT

A simple, economical brake system for small front-wheel-drive vehicles. The brake system has a hydraulic service brake system for the front axle wheels and an electric service brake system for the rear axle wheels. The hydraulic service brake system has a pedal-actuated master cylinder, from which brake lines lead to hydraulic wheel brakes. There is one shutoff valve in each of the brake lines, and each shutoff valve is bypassed by a line to a pump that pumps pressure fluid from the corresponding wheel brake to the master cylinder. The shutoff valves and the pumps, together with an electronic control unit and sensors that monitor the wheel rotation performance form an anti-lock arrangement for the hydraulic service brake system of the front axle of the vehicle.

1 Claim, 1 Drawing Sheet

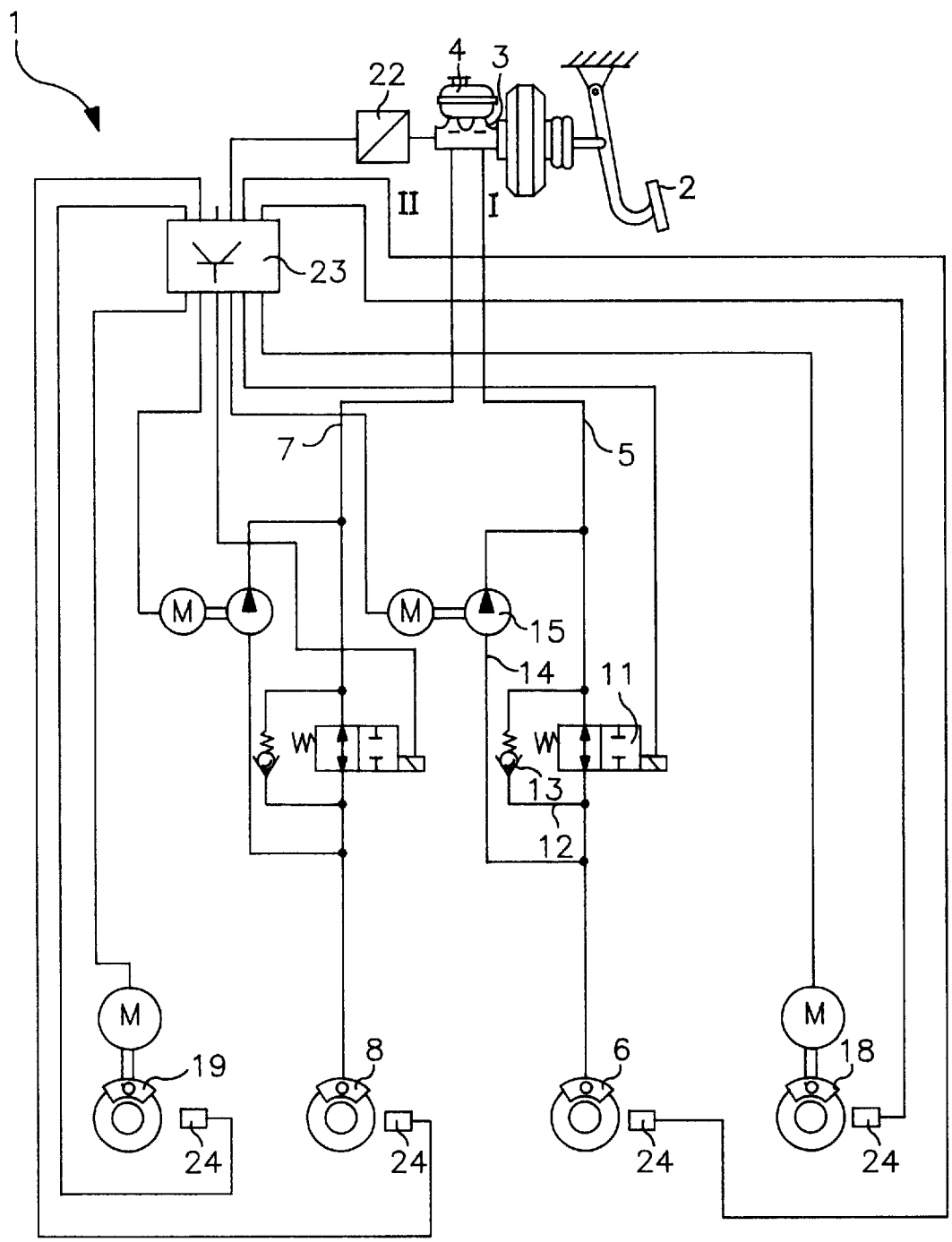

5,890,778

BRAKE DEVICE WITH AN ANTILOCK SYSTEM FOR A ROAD VEHICLE

PRIOR ART

The invention is based on a brake system for a passenger car road vehicle. One such brake system is already known (U.S. Pat. No. 5,234,262), in which the pressure modulators in the anti-lock mode not only act by means of a piston on a closing member of a check valve in the respective brake line but also vary the volume of a cylinder chamber for receiving pressure fluid drawn from the associated wheel brake. Each of the pressure modulators has an electric motor, which via a screw spindle drive displaces the pistons in both directions. This known embodiment requires a relatively major effort and expense for the pressure modulators and for controlling the current of the motor. Moreover, the dynamics of anti-lock control are reduced by the inertia of the piston drive.

An anti-lock brake system known from European Patent Disclosure EP-A 253 157 has a pressure modulator, disposed between a master cylinder and a wheel brake, that comprises an electric motor-drive pump and a parallel-connected electromagnetically actuated valve. In anti-lock control, the pump pumps pressure fluid from the wheel brake to the master cylinder, while the switched-over valve limits the flow of pressure fluid to the master cylinder and to the wheel brake. This embodiment and mode of operation of the pressure modulator allows only poor control quality.

OBJECT AND SUMMARY OF THE INVENTION

The object of the invention, in the brake system mentioned at the outset, is to embody an anti-lock arrangement of simple design and high control quality that is associated with the front axle wheel brakes, and to monitor the action of the wheel brakes of the brake system in the sense of closed-loop control.

This object is attained with the characteristics recited hereinafter.

ADVANTAGES OF THE INVENTION

The brake system according to the invention has the advantage over the prior art that it can be embodied more economically than that of the prior art, yet nevertheless meets the demands for a brake system for small and hence lightweight vehicles with front-wheel drive. Moreover, the brake system of the invention has high dynamics, since the shutoff valve has very short switching times and the pump is continuously on in the anti-lock mode. The expenditure for controlling the anti-lock arrangement is accordingly low. Because of the monitoring of the wheel brakes with sensors, the control unit that evaluates the sensor signals can regulate the action of the wheel brakes, i.e. in closed-loop fashion, in accordance with the pedal actuation.

BRIEF DESCRIPTION OF THE DRAWING

An exemplary embodiment of the invention is shown schematically in the drawing, in a brake system with hydraulic actuation at the front axle and electric actuation at the rear axle, and is described in further detail in the ensuing description.

DETAILED DESCRIPTION OF THE EXEMPLARY EMBODIMENT

The brake system 1 shown in the drawing is intended for use in a lightweight front wheel drive passenger car. It has both an electrical and a hydraulic service brake system. The brake system 1 is also provided with a device for controlling wheel slip.

In detail, the brake system 1 has a dual-circuit master cylinder 3, actuatable by a brake pedal 2, with a pressure fluid reservoir 4. In brake circuit I, a brake line 5 leads from the master cylinder 3 to a hydraulic wheel brake 6, which is associated with the right front wheel, not shown, of the vehicle. Brake circuit II has a brake line 7, which communicates with a hydraulic wheel brake 8 of the left front wheel, also not shown, of the vehicle. The hydraulic service brake system is thus associated with the front axle of the vehicle.

The two brake circuits I and II of the hydraulic service brake system are embodied identically; below, brake circuit I will therefore be described in detail.

Located in the brake line 5 between the master cylinder 3 and the wheel brake 6 is a 2/2-way valve, acting as a shutoff valve 11, with a spring-actuated normally open position and an electromagnetically actuated blocking position. The shutoff valve 11 is bypassed by a line 12 in which there is a one-way check valve 13 whose open direction is from the wheel brake 6 to the master cylinder 3. The shutoff valve 11 is bypassed by a second line 14, in which a pump 15 is located for pressure fluid, drivable by an electric motor and which pumps brake fluid from the wheel brake 6 to the master cylinder 3. The electric service brake system of the brake system 1 is conversely associated with the rear axle of the vehicle. It has an electric wheel brake 18 for the right rear wheel, not shown, and an electric wheel brake 19 for the left rear wheel, also not shown, of the vehicle. Both wheel brakes 18 and 19 have an identical design and are actuatable by an electric motor drive. The clamping device between the motor drive and the wheel brake may be embodied mechanically or hydraulically. The electric service brake system also includes a brake value transducer 22 which outputs an electrical set-point value as a function of pedal actuation.. This transducer communicates with an electronic control unit 23 of the brake system 1. The motor drive of the electric wheel brakes 18 and 19 is connected to the electronic control unit 23. Sensors 24 are also associated with the wheel brakes 6, 8, 18 and 19, and with these sensors the wheel rotation performance, braking action and/or braking force, and at the hydraulic wheel brakes 6 and 8 the brake pressure, can be sensed at all the wheels of the vehicle.

The sensors 24 are likewise connected to the electronic control unit 23. Also so connected are the two shutoff valves 11 and the electric motor drive of the two pumps 15 in the brake circuits I and II. In combination with the control unit 23 and the sensors 24, they form an anti-lock arrangement.

Upon vehicle braking by actuation of the brake pedal 2, brake pressure is generated in the master cylinder 3 and fed through the brake lines 5 and 7 into the hydraulic wheel brakes 6 and 8. On braking without any danger of locking, the shutoff valves 11 of both brake circuits I and II assume the open position shown. The pumps 15 are not driven at that time. Upon braking, an electrical set-point value is simultaneously formed by the brake value transducer 22 as a function of pedal actuation, on the basis of which value the electronic control unit 23 triggers the motor drive of the two electric wheel brakes 18 and 19. The control unit 23, with the aid of the sensors 24 at the wheel brakes 6, 8, 18 and 19, monitors the wheel rotation performance and/or the braking action and/or the braking force and/or, in the case of the hydraulic wheel brakes 6 and 8, the brake pressure. The electronic control unit 23, which logically links the set-point value of the brake value transducer 22 with the signals of the sensors 24, makes a controlling intervention into the motor drive of the electric wheel brakes 18 and 19, for instance in order to vary the distribution of braking force between the front and rear axles or to avert incipient wheel locking at the rear axle. Conversely, if excessive brake slip occurs at the front axle, for instance at the vehicle wheel associated with the hydraulic wheel brake 6, then the control unit 23 switches the shutoff valve 11 in the brake line 5 into its blocking position and puts the pump 15 of brake circuit I into operation. The shutoff valve 11 and the pump 15 form a pressure modulator, with which the brake pressure in the wheel brake 6 is reduced by returning pressure fluid to the master cylinder 3. Once the wheel rotation performance stabilizes, the shutoff valve 11 is switched to the open position while the pump 15 is still on, so that from the master cylinder 3, a pressure buildup in the wheel brake 6 can take place. In other words, two-gradient closed-loop pressure control (sawtooth control) is effected. By clocking the shutoff valve 11 in a manner adapted to the pumping capacity of the pump 15, an approximate holding of pressure in the wheel brake 6 can also be attained in the case of wheel slip control. When the wheel rotation performance is stable, the control unit 23 turns the pump 15 of brake circuit I off and switches the shutoff valve 11 into its open position.

The foregoing relates to preferred exemplary embodiments of the invention, it being understood that other variants and embodiments thereof are possible within the spirit and scope of the invention, the latter being defined by the appended claims.

What is claimed is:

1. An anti-lock brake system (1) for a light weight road vehicle, including wheels that are equipped with brakes, comprising a hydraulic service brake system, associated with a front axle of the on-road vehicle, a pedal-actuated dual-circuit master cylinder (3), which communicates, through brake lines (5, 7) with hydraulic wheel brakes (6, 8) of the front axle that are disposed in two separate brake circuits (1, 2), an electric service brake system, associated with wheel brakes (18, 19) of a rear axle of the on-road vehicle, an intermittently actuated electromagnetic shutoff valve (11), which is disposed alone in the brake line (5, 7), leading to a respective wheel brake (6, 8) of the front axle, of the respective brake circuit (I, II), said shutoff valve assumes an open position when without current and assumes a closed position when a current is applied thereto, a pump (15) is connected in a separate line (14) that bypasses said shutoff valve, said pump communicates directly on an intake side with the hydraulic wheel brakes (6 or 8) and directly on a pressure side with the master cylinder (3) in order to pump pressure fluid from the wheel brake (6, 8) to the master cylinder (3) during an anti-lock control operation, said cutoff valve (11) is switched into a closed position for pressure reduction in the wheel brakes (6, 8) and switched into an open position for pressure buildup in the wheel brakes (6, 8) and for holding the pressure approximately constant in the brake lines (5, 7), said cutoff valve is timed in operation to a pumping capacity of the pump while the pump in the anti-lock mode pumps continuously, said electric service brake system includes an electric motor connected with each of said wheel brakes (18, 19) of said rear axle for actuation of said brakes, a brake value transducer (22) is connected with said master cylinder for generating an electrical set-point value, as a function of pedal actuation, for actuating said electric motors for operating the electric wheel brakes (18, 19), a sensor (24) is positioned juxtaposed each wheel for sensing a rotation of the wheel, and an electronic control unit (23) is connected electrically with the brake value transducer (22), the electric motors, each sensor, the shutoff valve (11) and the pump (15) in order to trigger the electric motors as a function of the electric set-point value of the brake value transducer (22) and to trigger the shutoff valve and the pump as a function of the wheel rotation performance.

* * * * *